United States Patent
Wittmaak, Jr. et al.

(10) Patent No.: US 11,972,692 B2
(45) Date of Patent: Apr. 30, 2024

(54) UNMANNED AIRCRAFT VEHICLE STATE AWARENESS

(71) Applicant: Bell Textron Inc., Fort Worth, TX (US)

(72) Inventors: John R. Wittmaak, Jr., Newark, TX (US); Joshua A. Edler, Irving, TX (US); Alan H. Steinert, Fort Worth, TX (US); Joshua A Duckett, Trophy Club, TX (US)

(73) Assignee: Textron Innovations Inc., Providence, RI (US)

( * ) Notice: Subject to any disclaimer, the term of this patent is extended or adjusted under 35 U.S.C. 154(b) by 400 days.

(21) Appl. No.: 17/154,602

(22) Filed: Jan. 21, 2021

(65) Prior Publication Data

US 2022/0230551 A1  Jul. 21, 2022

(51) Int. Cl.
| G08G 5/00 | (2006.01) |
| B64C 39/02 | (2023.01) |
| B64D 45/00 | (2006.01) |
| G07C 5/08 | (2006.01) |
| G08G 5/04 | (2006.01) |
| B64U 101/00 | (2023.01) |

(52) U.S. Cl.
CPC ........... G08G 5/045 (2013.01); B64C 39/024 (2013.01); B64D 45/00 (2013.01); G07C 5/0816 (2013.01); G08G 5/003 (2013.01); B64D 2045/0085 (2013.01); B64U 2101/00 (2023.01)

(58) Field of Classification Search
CPC ...... G08G 5/045; G08G 5/003; B64C 39/024; B64D 45/00; B64D 2045/0085; G07C 5/0816; B64U 2101/00
See application file for complete search history.

(56) References Cited

U.S. PATENT DOCUMENTS

| 6,179,778 B1 | 1/2001 | Leonov et al. |
| 7,302,316 B2 | 11/2007 | Beard et al. |
| 9,096,327 B2 | 8/2015 | Tucker et al. |
| 9,108,729 B2 | 8/2015 | Duggan et al. |

(Continued)

FOREIGN PATENT DOCUMENTS

| AU | 2005288517 B2 | 4/2006 |
| CN | 204440169 U | 7/2015 |

OTHER PUBLICATIONS

Garrett-Glaser, Brian, "Five Companies and NUAIR Begin Work on UTM Contingency Management", Aviation Today, Jul. 14, 2020, 2 pages, CAL Analytics, Beavercreek, Ohio.

(Continued)

*Primary Examiner* — Peter D Nolan
*Assistant Examiner* — Roy Rhee
(74) *Attorney, Agent, or Firm* — Frost Brown Todd LLP

(57) ABSTRACT

Methods and systems are described for increasing the safety of unmanned vehicles. Failure rates of components can be combined and adjusted if necessary given sensor data or statistical or historical data that impacts failure rates. The failure rates of components can be combined to give an overall failure or success rate for a vehicle and can be compared to an accepted failure or success rate in connection with a hazard. Hazards with heightened safety requirements can be avoided by a contingency maneuver if the unmanned vehicle's failure or success rate is not acceptable.

18 Claims, 9 Drawing Sheets

(56) References Cited

U.S. PATENT DOCUMENTS

| | | | |
|---|---|---|---|
| 9,405,296 B2 | 8/2016 | Levien et al. | |
| 9,508,264 B2 | 11/2016 | Chan et al. | |
| 9,646,502 B1* | 5/2017 | Gentry | G08G 5/0013 |
| 9,747,809 B2 | 8/2017 | Levien et al. | |
| 9,776,716 B2 | 10/2017 | Levien et al. | |
| 9,922,282 B2 | 3/2018 | Weller et al. | |
| 10,214,285 B2 | 2/2019 | McCullough et al. | |
| 10,279,906 B2 | 5/2019 | Levien et al. | |
| 10,296,862 B1 | 5/2019 | Oddo et al. | |
| 10,423,831 B2 | 9/2019 | De Mers | |
| 10,474,973 B2 | 11/2019 | Tucker et al. | |
| 10,597,164 B2 | 3/2020 | Oldroyd et al. | |
| 10,618,646 B2 | 4/2020 | McCullough et al. | |
| 10,783,671 B1 | 9/2020 | Chavez et al. | |
| 10,913,541 B2 | 2/2021 | Oldroyd et al. | |
| 10,974,851 B2 | 4/2021 | Chavez et al. | |
| 2003/0014165 A1 | 1/2003 | Baker et al. | |
| 2003/0225489 A1 | 12/2003 | Tsao | |
| 2008/0256383 A1* | 10/2008 | Bose | G06F 11/008 714/1 |
| 2010/0102174 A1* | 4/2010 | Roy | H05H 1/2439 244/23 C |
| 2010/0250033 A1 | 9/2010 | Ingram et al. | |
| 2015/0336547 A1* | 11/2015 | Dagan | G06T 7/269 701/70 |
| 2016/0202694 A1 | 7/2016 | Malecki et al. | |
| 2016/0284221 A1* | 9/2016 | Hinkle | G08G 5/0013 |
| 2019/0080524 A1 | 3/2019 | Tucker | |
| 2020/0148393 A1 | 5/2020 | Chavez et al. | |
| 2022/0185493 A1* | 6/2022 | Chen | G07C 5/0841 |
| 2022/0207932 A1* | 6/2022 | Ponda | B64U 50/13 |

OTHER PUBLICATIONS

Schumann, Johann et al., "Towards Real-Time, On-Board, Hardware-supported Sensor and Software Health Management for Unmanned Aerial Systems", Annual Conference of the Prognostics and Health Management Society 2013, 21 pages.

"CAL Analytics Adds Contingency Management Platform to Reduce Risk", UAS Magazine—The Latest News on Unmanned Aerial Systems, Nov. 2, 2020, 2 pages, CAL Analytics, Beavercreek, Ohio.

* cited by examiner

UNMANNED AIRCRAFT VEHICLE STATE AWARENESS

TECHNICAL FIELD

The present disclosure is directed to unmanned flight systems and more particularly to hazard avoidance and risk analysis of unmanned flight missions and aircraft.

BACKGROUND OF THE INVENTION

Unmanned flight systems are becoming more and more prevalent. Both military and commercial entities are finding uses for unmanned flight. With unmanned flight comes risks, because when a hazard arises there is no onboard pilot to redirect an aircraft. Systems and methods are needed that help protect the aircraft itself, but also protect the innocent lives of civilians and non-combatants.

BRIEF SUMMARY OF THE INVENTION

One embodiment under the present disclosure can comprise a method of operating an unmanned vehicle comprising a vehicle management system (VMS). This method can comprise; receiving, by the VMS, a travel plan identifying one or more hazards along a travel route; receiving, by the VMS, statistical failure data related to one or more components comprising the unmanned vehicle; collecting, by the VMS, sensor data from one or more sensors comprising the unmanned vehicle, the sensor data related to operational capabilities of the unmanned vehicle; calculating, by the VMS, a health state assessment, the health state assessment comprising a probability of failure related to the one or more hazards and calculated with the statistical failure data and the sensor data; and comparing, by the VMS, the probability of failure to an accepted probability of failure. If the probability of failure is greater than the accepted probability of failure, activating a contingency maneuver, and if the probability of failure is less than the accepted probability of failure, continuing the travel plan.

Another embodiment under the present disclosure can comprise an unmanned aircraft comprising a vehicle management system (VMS). The unmanned aircraft can comprise: one or more components configured to assist in operating the unmanned aircraft; one or more sensors configured to detect real-time operational data of the unmanned aircraft; one or more processors comprising the VMS that are operable to receive statistical data regarding failure of the one or more components from a remote database, further operable to receive the real-time operational data from the one or more sensors, and further operable to access a flight plan comprising identified critical elements along the flight plan. The VMS is operable to, upon approaching a critical element, calculate a state health assessment, the state health assessment calculated by; calculating a component failure rate for each of the one or more components using the statistical data; analyzing the real-time operational data to determine if it mandates an adjustment to the component failure rates; adjusting the component failure rates if mandated by the real-time operational data; and multiplying the adjusted component failure rates to give a net failure probability rate. The VMS is further operable to compare the net failure probability rate to an accepted failure probability rate, and if the net failure probability rate is greater than the accepted failure probability rate, activating a contingency maneuver, and if the net failure probability rate is less than the accepted failure probability rate, continuing the flight plan.

Another embodiment under the present disclosure can comprise a method of operating an unmanned aircraft comprising a vehicle management system (VMS). This method can comprise: receiving, by the VMS, a rotor failure rate of one or more rotors comprising the unmanned aircraft; receiving, by the VMS, a battery failure rate of one or more batteries comprising the unmanned aircraft; receiving, by the VMS, real-time operational data from one or more sensors comprising the unmanned aircraft; receiving, by the VMS, a flight plan describing a route of travel and comprising one or more critical elements along the route of travel; controlling, by the VMS, the unmanned aircraft to takeoff and begin the flight plan. Upon nearing the one or more critical elements, further steps include, adjusting, by the VMS, the battery failure rate and the rotor failure rate using the real-time operational data to provide an adjusted battery rate and an adjusted rotor rate; multiplying, by the VMS, the adjusted battery rate and the adjusted rotor rate to yield a critical element failure rate; comparing, by the VMS, the critical element failure rate to an approved failure rate related to the one or more critical elements. If the critical element failure rate is greater than the approved failure rate, then a contingency action for the unmanned aircraft to perform is activated, and if the critical element failure rate is less than the approved failure rate, the unmanned aircraft continues along the flight plan.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
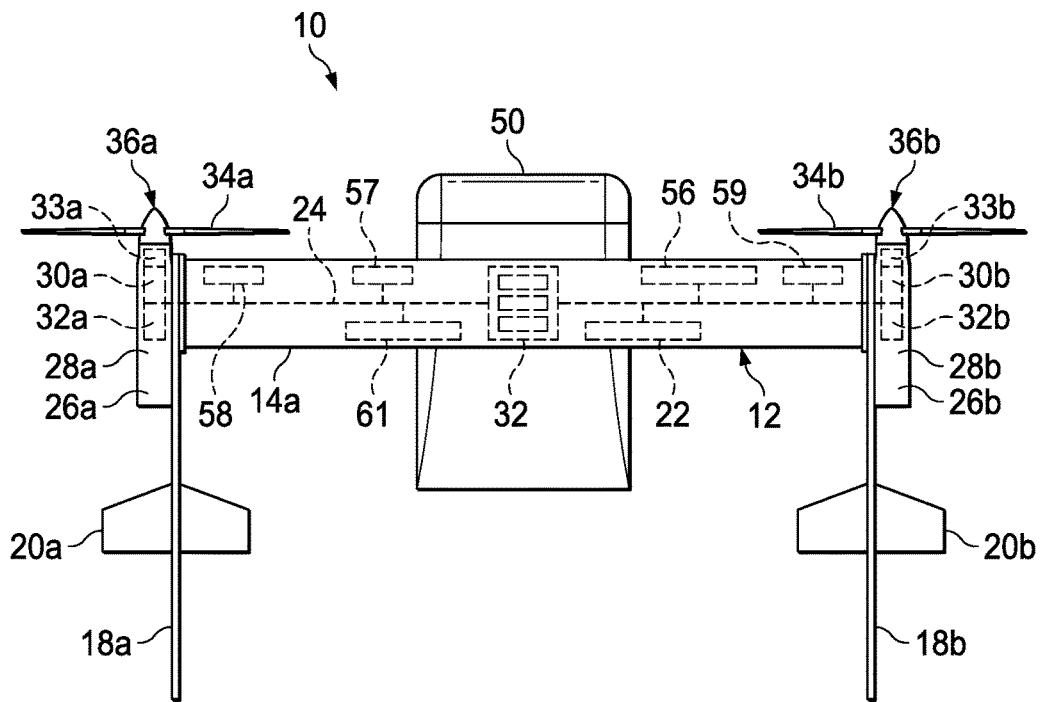
FIGS. 1A-1F show schematic views of an unmanned aircraft under the present disclosure.
Figure 1B:
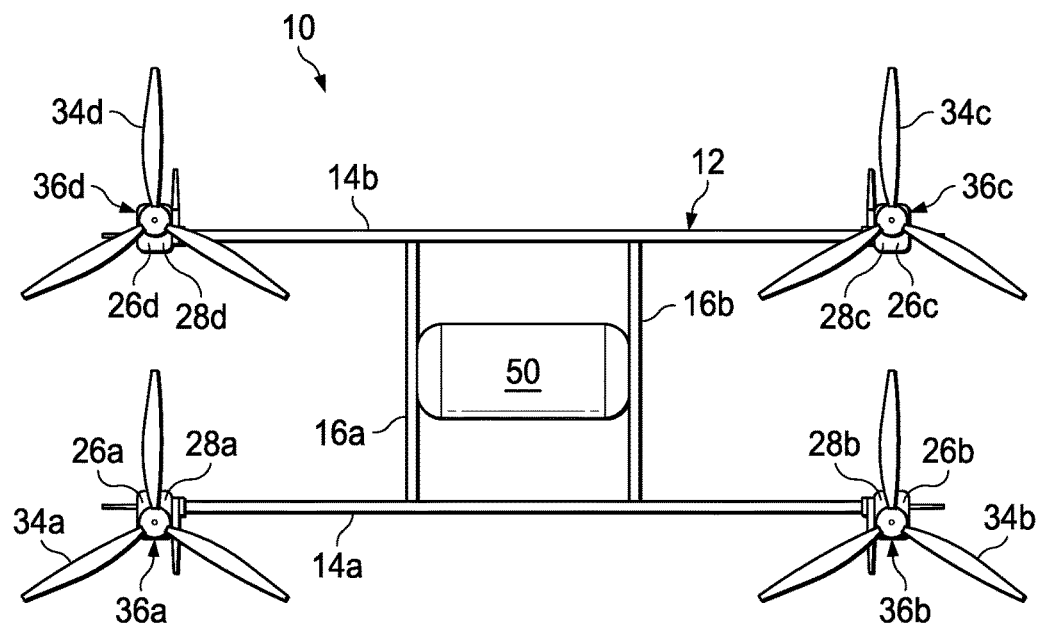
Figure 1C:
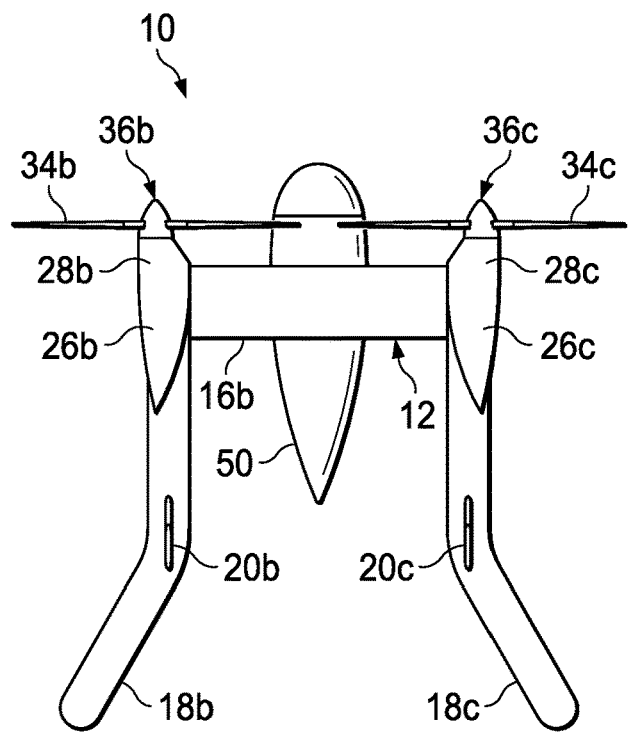
Figure 1D:
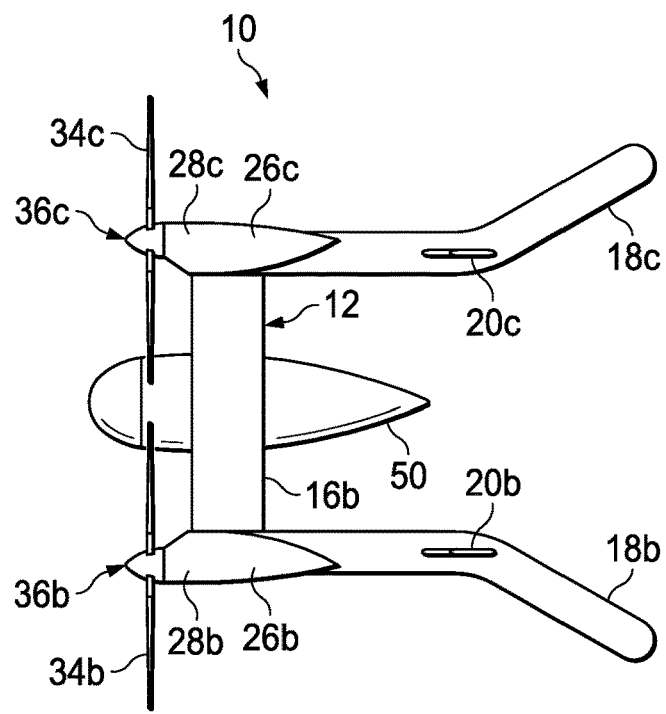
Figure 1E:
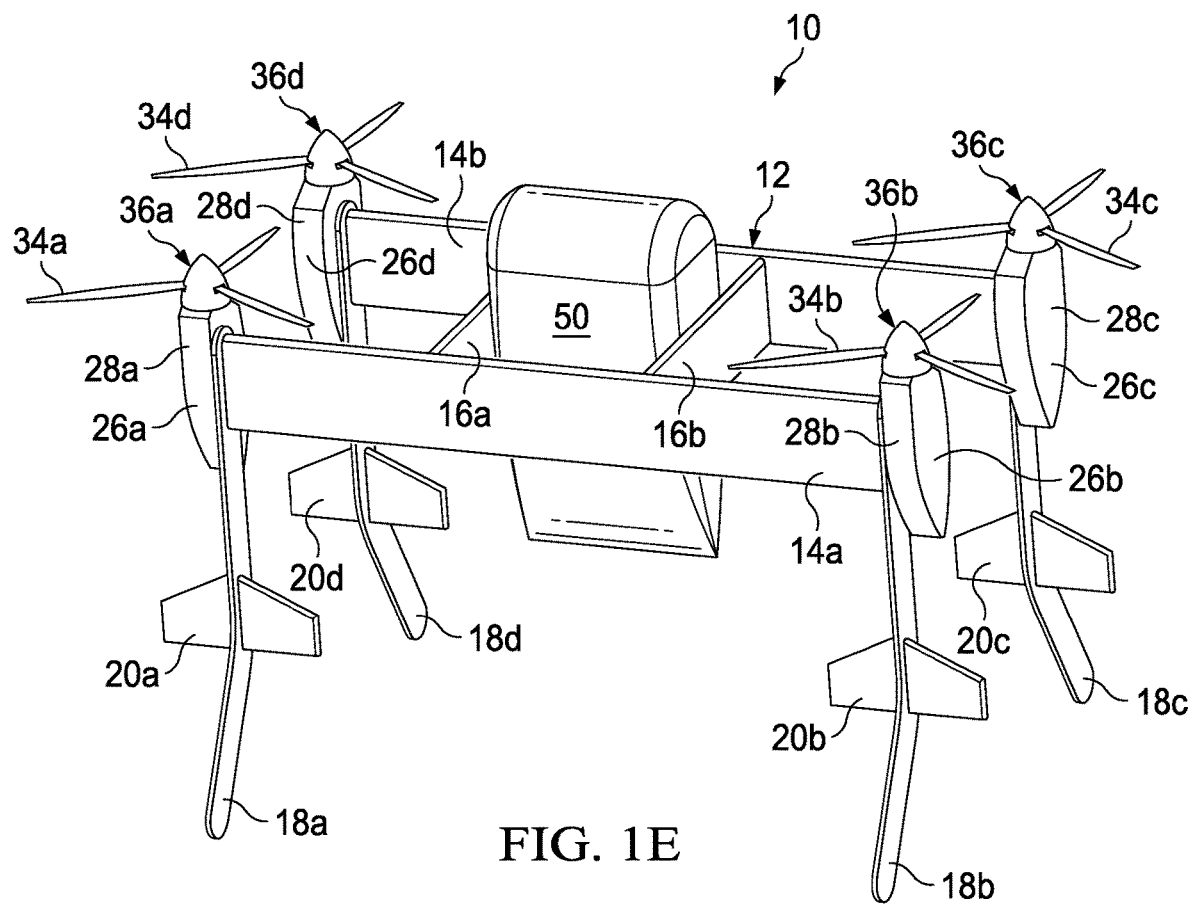
Figure 1F:
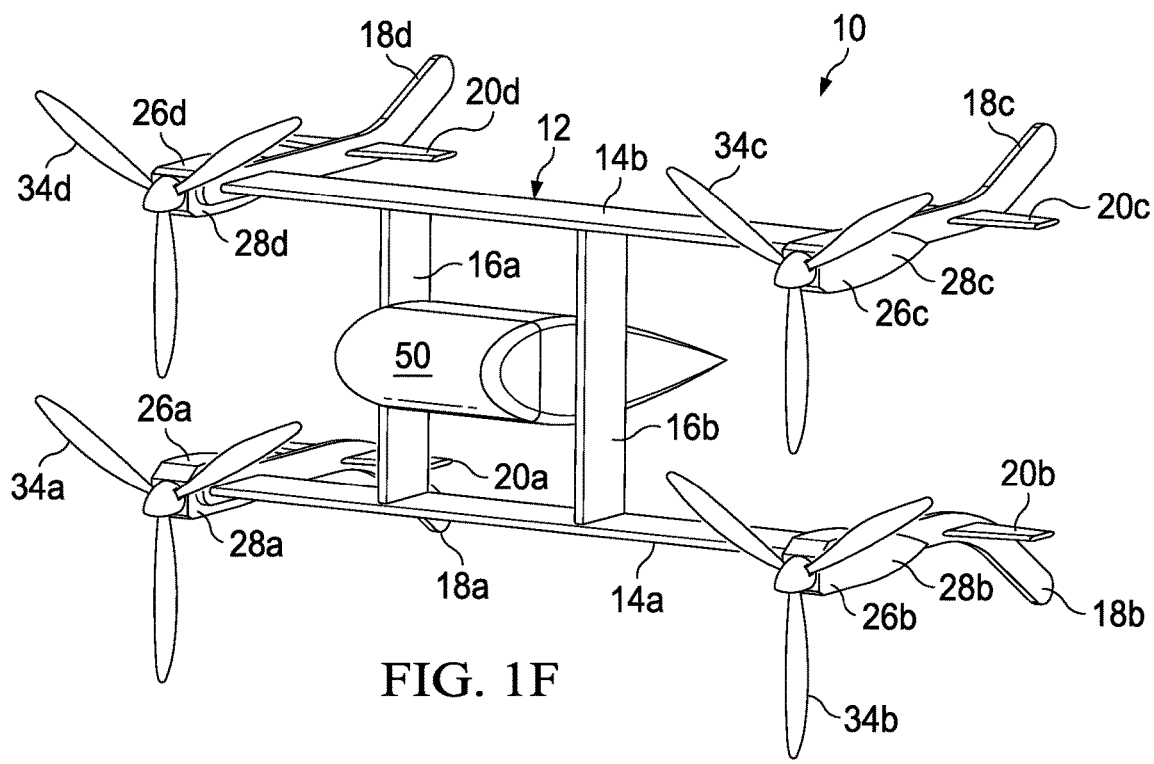

Referring to FIGS. 1A-1F in the drawings, various views of an aircraft embodiment 10 under the present disclosure can be seen. Aircraft 10 comprises an unmanned aircraft having a distributed thrust array including gimbal mounted propulsion systems operable for thrust vectoring are depicted. FIGS. 1A, 1C, 1E depict aircraft 10 in thrust-borne flight which may also be referred to as the vertical takeoff and landing or VTOL flight mode of aircraft 10. FIGS. 1B, 1D, 1F depict aircraft 10 in wing-borne flight which may also be referred to as the forward or high-speed forward flight mode of aircraft 10. In the illustrated embodiment, the airframe 12 of aircraft 10 includes wings 14a, 14b each having an airfoil cross-section that generates lift responsive to the forward airspeed of aircraft 10. Wings 14a, 14b may be formed as single members or may be formed from multiple wing sections. Extending generally perpendicularly between wings 14a, 14b are two truss structures depicted as pylons 16a, 16b. In other embodiments, more than two pylons may be present. Wings 14a, 14b and pylons 16a, 16b may be coupled together at the respective intersections using mechanical connections such as bolts, screws, rivets, adhesives and/or other suitable joining technique. Extending generally perpendicularly from wings 14a, 14b are landing gear depicted as tail members 18a, 18b, 18c, 18d that enable aircraft 10 to operate as a tail-sitting aircraft. In the illustrated embodiment, tail members 18a, 18b, 18c, 18d are fixed landing struts. In other embodiments, tail members 18a, 18b, 18c, 18d may include passively operated pneumatic landing struts or actively operated telescoping landing struts with or without wheels for ground maneuvers. Tail members 18a, 18b, 18c, 18d each include a control surface 20a, 20b, 20c, 20d, respectively, that may be passive or active aerosurfaces that serve as vertical stabilizers and/or elevators during wing-borne flight and serve to enhance hover stability during thrust-borne flight.

In the illustrated embodiment, wings 14a, 14b and/or pylons 16a, 16b may contain one or more of electrical power sources depicted as batteries 22 in wing 14a, as best seen in FIG. 1A. Batteries 22 supply electrical power to flight control system 32. In some embodiments, batteries 22 may be used to supply electrical power for the distributed thrust array of aircraft 10. Wings 14a, 14b and/or pylons 16a, 16b also contain a communication network 24 that enables flight control system 32 to communicate with the distributed thrust array of aircraft 10.

In the illustrated embodiment, the distributed thrust array includes four propulsion assemblies 26a, 26b, 26c, 26d that are independently operated and controlled by flight control system 32. As illustrated, propulsion assemblies 26a, 26b, 26c, 26d are coupled to the outboard ends of wings 14a, 14b. In other embodiments, propulsion assemblies 26a, 26b, 26c, 26d could have other configurations including close coupled configurations, high wing configurations, low wing configurations or other suitable configuration. In the illustrated embodiment, each propulsion assembly 26a, 26b, 26c, 26d includes a housing 28a, 28b, 28c, 28d, that contains components such as an electric motor, a gimbal, one or more actuators and an electronics node including, for example, batteries, controllers, sensors and other desired electronic equipment. Only electric motors 30a, 30b and electronics nodes 32a, 32b are visible in FIG. 1A. The electric motors of each propulsion assembly 26a, 26b, 26c, 26d are preferably operated responsive to electrical energy from the battery or batteries disposed with that housings, thereby forming a distributed electrically powered thrust array. Alternatively, or additionally, electrical power may be supplied to the electric motors and/or the batteries disposed with the housing from batteries 22 carried by airframe 12 via communications network 24. In other embodiments, the propulsion assemblies may include internal combustion engines or hydraulic motors.

Each propulsion assembly 26a, 26b, 26c, 26d includes a rotor assembly 34a, 34b, 34c, 34d. Each rotor assembly 34a, 34b, 34c, 34d is directly or indirectly coupled to an output drive of a respective electrical motor 30a, 30b, 30c, 30d that rotates the rotor assembly 34a, 34b, 34c, 34d in a rotational plane to generate thrust for aircraft 10. In the illustrated embodiment, rotor assemblies 34a, 34b, 34c, 34d each include three rotor blades having a fixed pitch. In other embodiments, the rotor assemblies could have other numbers of rotor blades both less than and greater than three. Alternatively, or additionally, the rotor assemblies could have variable pitch rotor blades with collective and/or cyclic pitch control. Each electrical motor 30a, 30b, 30c, 30d is paired with a rotor assembly 34a, 34b, 34c, 34d, for example electrical motor 30a and rotor assembly 34a, to form a propulsion system 36a, 36b, 36c, 36d. As described herein, each propulsion system 36a, 36b, 36c, 36d may have a single-axis or a two-axis tilting degree of freedom relative to housings 28a, 28b, 28c, 28d and thus airframe 12 such that propulsion systems 36a, 36b, 36c, 36d are operable for thrust vectoring.

Aircraft 10 may operate as a transport aircraft for a pod assembly 50 that is fixed to or selectively attachable to and detachable from airframe 12. In the illustrated embodiment, pylons 16a, 16b include receiving assemblies for coupling with pod assembly 50. The connection between pylons 16a, 16b and pod assembly 50 may be a fixed connection that secures pod assembly 50 in a single location relative to airframe 12. Alternatively, pod assembly 50 may be allowed to rotate and/or translate relative to airframe 12 during ground and/or flight operations. Airframe 12 preferably has remote release capabilities of pod assembly 50. For example, this feature allows airframe 12 to drop pod assembly 50 at a desire location following transportation. In addition, this feature allows airframe 12 to jettison pod assembly 50 during flight, for example, in the event of an emergency such as a propulsion assembly or other system of aircraft 10 becoming compromised. One or more communication channels may be established between pod assembly 50 and airframe 12 when pod assembly 50 is attached therewith. A quick disconnect harness may be coupled between pod assembly 50 and airframe 12 such that flight control system 32 may send commands to pod assembly 50 to perform functions. For example, flight control system 32 may operate doors of pod assembly 50 between open and closed positions to enable loading and unloading of a payload to be transported within pod assembly 50.

Aircraft 10 can implement the teachings of U.S. Pat. No. 10,618,646 B2, titled "Rotor Assembly Having a Ball Joint for Thrust Vectoring Capabilities;" and U.S. patent application Ser. No. 16/790,676, titled "Aircraft Having Redundant Directional Control," the contents of which are hereby incorporated by reference.

Wings 14a, 14b and pylons 16a, 16b preferably include central passageways operable to contain flight control systems, energy sources, communication lines and other desired systems. For example, as best seen in FIG. 1A, wing 14a houses the flight control system 32 of aircraft 10. Flight control system 32 is preferably a redundant digital flight control system. In the illustrated embodiment, flight control system 32 is a triply redundant digital flight control system including three independent flight control computers. Flight control system 32 preferably includes non-transitory computer readable storage media including a set of computer instructions executable by one or more processors for controlling the operation of aircraft 10. Flight control system 32 may be implemented on one or more general-purpose computers, special purpose computers or other machines with memory and processing capability. For example, flight control system 32 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 32 may be a microprocessor-based system operable to execute program code in the form of machine-executable instructions. In addition, flight control system 32 may be selectively connectable to other computer systems via a proprietary encrypted network, a public encrypted network, the Internet or other suitable communication network that may include both wired and wireless connections.

Flight control system 32 communicates via communications network 24 with the electronics nodes of each propulsion assembly 26a, 26b, 26c, 26d, such as electronics node 32a of propulsion assembly 26a and electronics node 32b of propulsion assembly 26b. Flight control system 32 receives sensor data from and sends flight command information to the electronics nodes of each propulsion assembly 26a, 26b, 26c, 26d such that each propulsion assembly 26a, 26b, 26c, 26d may be individually and independently controlled and operated. For example, flight control system 32 is operable to individually and independently control the operating speed and thrust vector of each propulsion assembly 26a, 26b, 26c, 26d. Flight control system 32 may autonomously control some or all aspects of flight operation for aircraft 10. Flight control system 32 is also operable to communicate with remote systems, such as a ground station via a wireless communications protocol. The remote system may be operable to receive flight data from and provide commands to flight control system 32 to enable remote flight control over some or all aspects of flight operation for aircraft 10. The autonomous and/or remote operation of aircraft 10 enables aircraft 10 to perform unmanned logistic operations for both military and commercial applications.

Flight control system 32 can be coupled to rotor sensors 33a and 33b, shown in FIG. 1A (rotor sensors 33c and 33d also present but not shown). Rotor sensors 33a/b can detect, measure, or otherwise monitor behavior of their respective rotor assemblies 34a/b. Flight control system 32 can further be coupled to accelerometer 56, vibration sensor 57, and other sensors 58, and 59. A plurality of sensors are possible. Sensors may be used for temperature (at any point in the aircraft, such as near a rotor assembly, battery, or near a processor), propulsion system pitch angle, aircraft pitch, roll, and yaw axis orientation, acceleration, velocity, location such as by GPS (global positioning system), weight, altitude, elapsed service time, or to measure other onboard and external characteristics. Any of these sensors may be located anywhere that is useful on the aircraft 10. For example, vibration sensors may be located on each rotor assembly 34, as well as near a processor or near pod 50. Temperature or pitch may be measured at different locations on the aircraft 10. Communications interface 61 can be coupled to flight control system 32 and may provide wireless communication, such as with a flight control tower or system. Cellular, satellite, hardline, and other types of communication interfaces are possible.

Figure 2:
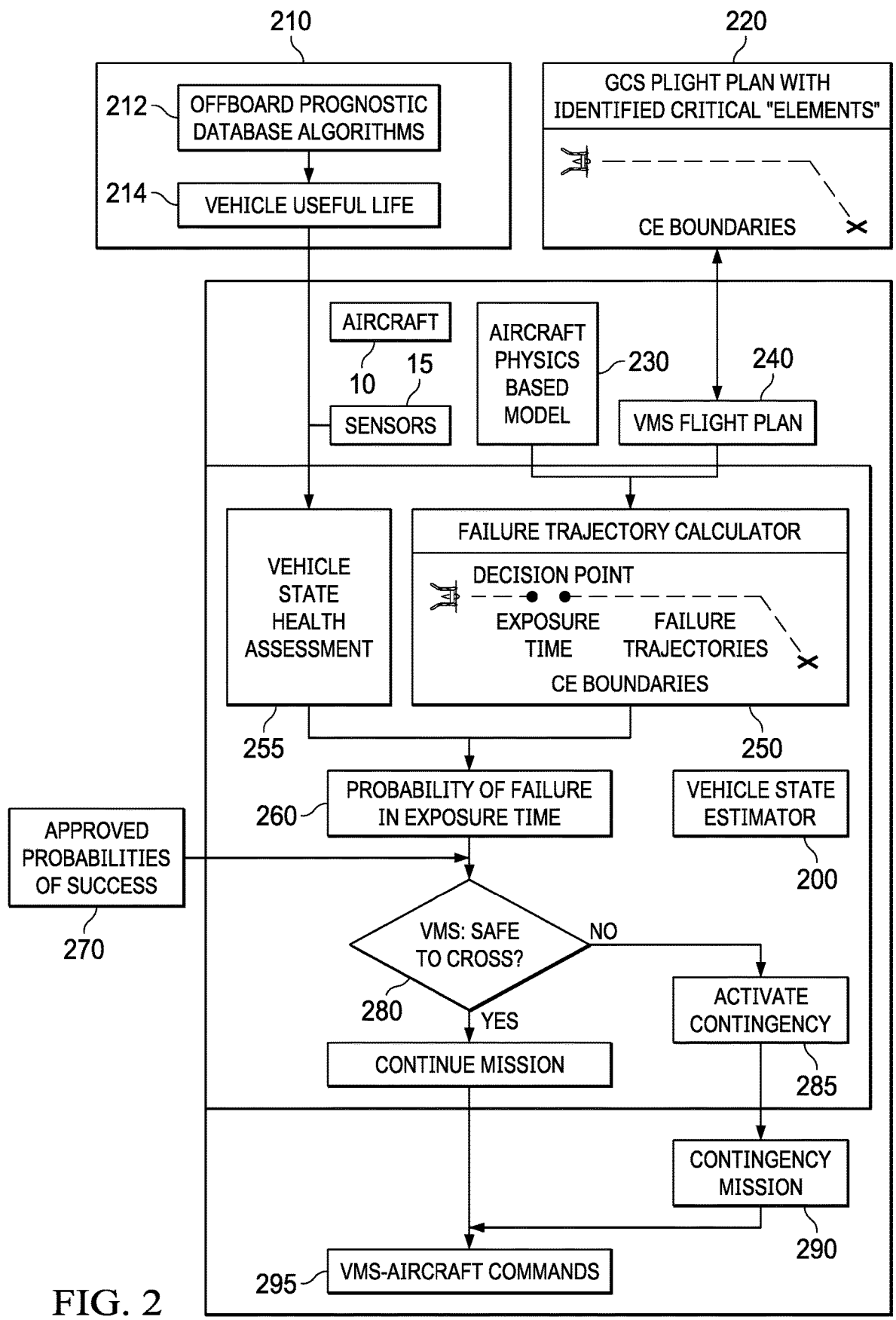
FIG. 2 shows a flow chart embodiment of a control system under the present disclosure.

Flight control system 32 may comprise a vehicle state estimator 200, shown in a possible embodiment in FIG. 2. Vehicle state estimator 200 can receive vehicle or component information from database 210 and combine it with data from sensors 15 (such as sensors 56, 57, 58, 59 in FIG. 1A) to create a vehicle state health assessment 255. The health state assessment can comprise a probability of failure related to the one or more hazards and calculated with the statistical failure data and the sensor data. The health state assessment can alternatively comprise a probability of success similarly calculated. Vehicle health state assessment may comprise an overall failure rate (e.g. $1 \times 10^{-7}$), that is a combined failure rate of various components (e.g. rotor assemblies with failure rates of $1 \times 10^{-8}$, blades with rates of $1 \times 10^{-11}$, clamps with rate of $1 \times 10^{-10}$, combined to yield the overall failure rate). State estimator 200 can also receive a flight plan critical element data set, including hazards, from a GCS (ground control system) 220, combine it with an onboard flight plan 240 from a vehicle monitoring system (preferably comprising flight control system 32) and an onboard physics based model 230 for modeling flight trajectory and behavior. Using the information from elements 220, 230, and 240, a failure trajectory calculator 250 portion of the vehicle state estimator 200 can compute flight trajectories and other outcome data due to a possible failure at any point in time or location relative to the flight plan and critical elements. For example, at a time t, failure may look like a controlled or uncontrolled decent to ground with a possible radius for a touchdown location. At probability calculation 260, the state estimator can combine the vehicle state health assessment 255 with the failure trajectory calculator 250 to yield a probability of failure at a given location or plan segment, and/or at a given time or time period, t. The probability of failure, for example $1 \times 10^{-9}$, can be compared to an approved probability 270. Approved probability 270 can be express as a probability of success (e.g. 99.999%) or as a probability of failure (e.g. $1 \times 10^{-9}$), as long as the system and any users realize the method being used. At 280, it is determined if the current mission is safe to continue. For example, if an approved probability of success is a failure rate of $1 \times 10^{-5}$ or better, then a failure rate of $1 \times 10^{-9}$ would mean it is safe to continue. When safe, the state estimator 200 would continue to create aircraft commands 295 so as to continue the flight plan route. Alternatively, if an approved probability were $1 \times 10^{-11}$, then a failure rate of $1 \times 10^{-9}$ would fail, and state estimator 200 would activate a contingency maneuver or action at 285. The contingency mission 290 would be carried out by the aircraft 10 before returning to the GCS flight plan 220 or VMS flight plan 240 for further instructions. The foregoing provides a brief description of the vehicle state estimator 200, but more description can show the interplay among the various components.

Database 210 can comprise prognostic algorithms about vehicle maintenance, vehicle useful life data, or any type of statistical measure of vehicle or component useful life. This can include data regarding the predicted life of a rotor assembly 34, or any other component of aircraft 10. Rotors, blades, batteries, actuators, sensors, struts, clamps, welding, wings, engines, seals, adhesives, bolts, processors, communication interfaces, and other components may have estimated life cycles that can be used by the state estimator 200. Database 210 can also provide state estimator with prognostic information related to diagnosing onboard problems. For example, when combined with data from sensors 15, data from database 10 may assist flight control system 32 in realizing that a change in a pitch angle of the aircraft 10 may be due to a partial or whole loss of power in a rotor assembly 34. This may change the estimated failure rate of the given rotor assembly 34. For example, one rotor assembly may have an updated failure rate of $1 \times 10^{-3}$, while the other rotor assemblies may stay at $1 \times 10^{-9}$. The state estimator 200 of flight control system 32 may then adjust the capabilities of said rotor assembly for creating a vehicle state health assessment 255. Temperature changes detected by sensors 15 may impact failure rates. For example, batteries or rotor assemblies may have decreased life expectancy at significantly higher or lower component or environmental temps. Altitude or pressure may change failure rates of processors, or accelerometers. At a given altitude, temperature, and pressure, a vehicle state health assessment may yield an expected failure rate of $1 \times 10^{-12}$. An hour later, with minimal physical wear and tear on components, but the aircraft operating at a different altitude, temperature and pressure, an expected failure rate may be $1 \times 10^{-5}$. The change in failure rate may be due to a chosen processor type that is susceptible to temperature changes, or possibly rotor assemblies that are susceptible to pressure and altitude extremes. Failure rates may also change over time. A rotor blade may have a given failure rate in its first year or first 100 hours of service, a different one in the second year or second 100 hours of service, and so forth. The vehicle health state assessment 255 can take into account failure rates for any component on the aircraft 10. The monitoring of the vehicle health state assessment is preferably done in real time. Alternatively, time increments can be used as desired.

Database 210, the data it tracks and stores, its communication with aircraft 10, and how such data is used by aircraft 10 can make use of the teachings of the following references, which are hereby incorporated by reference: U.S. Pat. No. 9,096,327 B2, titled "Aircraft Health Assessment System;" U.S. Pat. No. 10,474,973 B2, titled "Aircraft Fleet Maintenance System;" U.S. Pat. No. 10,783,671 B1, titled "Systems and Methods for Aligning Augmented Reality Display With Real-Time Location Sensors;" U.S. patent application Ser. No. 16/186,158, titled "System and Method for Maintaining and Configuring Rotorcraft;" and U.S. patent application Ser. No. 15/879,207, titled "On-Component Tracking of Maintenance, Usage, and Remaining Useful Life."

GCS flight plan 220 can provide state estimator 200 and aircraft 10a flight plan 240 that is stored by the vehicle monitoring system (which preferably comprises part of flight control system 32). GCS flight plan 220 preferably will be sent by a GCS. Flight plan 240 preferably comprises a path of flight with trajectories and takeoff and landing information. Flight plans 220/240 preferably also comprises identified critical elements, such as hazards or areas with enhanced safety requirements. For instance, an identified area around a city or other congested population area may be a critical element, due to heightened safety requirements when compared to rural or other sparsely populated areas. Other possible critical elements can be ground features such busy roadways, high population density areas, schools, and critical infrastructure. Critical elements can be airspace related features such as congested and controlled airspaces or airspace boundaries.

Aircraft 10 can comprise communication interfaces to communicate with database 210 and GCS 205. Cellular, satellite, hardline, Wi-Fi, Bluetooth, or other interfaces can be used.

The failure trajectory calculator 250 can use the flight plan 240 with identified critical elements, and a physics based model 230, to identify decision points along the flight plan where the vehicle state estimator 200 would have to decide to proceed or activate a contingency based on the then-current vehicle state health assessment 255. For example, an identified critical element may be a school. Entering airspace over a school, or radius around a school, can be identified as a decision point. At the decision point, the failure trajectory calculator 250 can be combined with the vehicle state health assessment 255 to calculate a probability of failure during an exposure time, such as flight time over the school. Such a probability can be compared to an accepted failure rate to determine whether to continue the original flight plan or to take a contingency action. An accepted failure and success rates may include rates satisfying those required and/or approved by the FAA (Federal Aviation Authority) or another regulatory, standards, or commercial entity.

Figure 3:
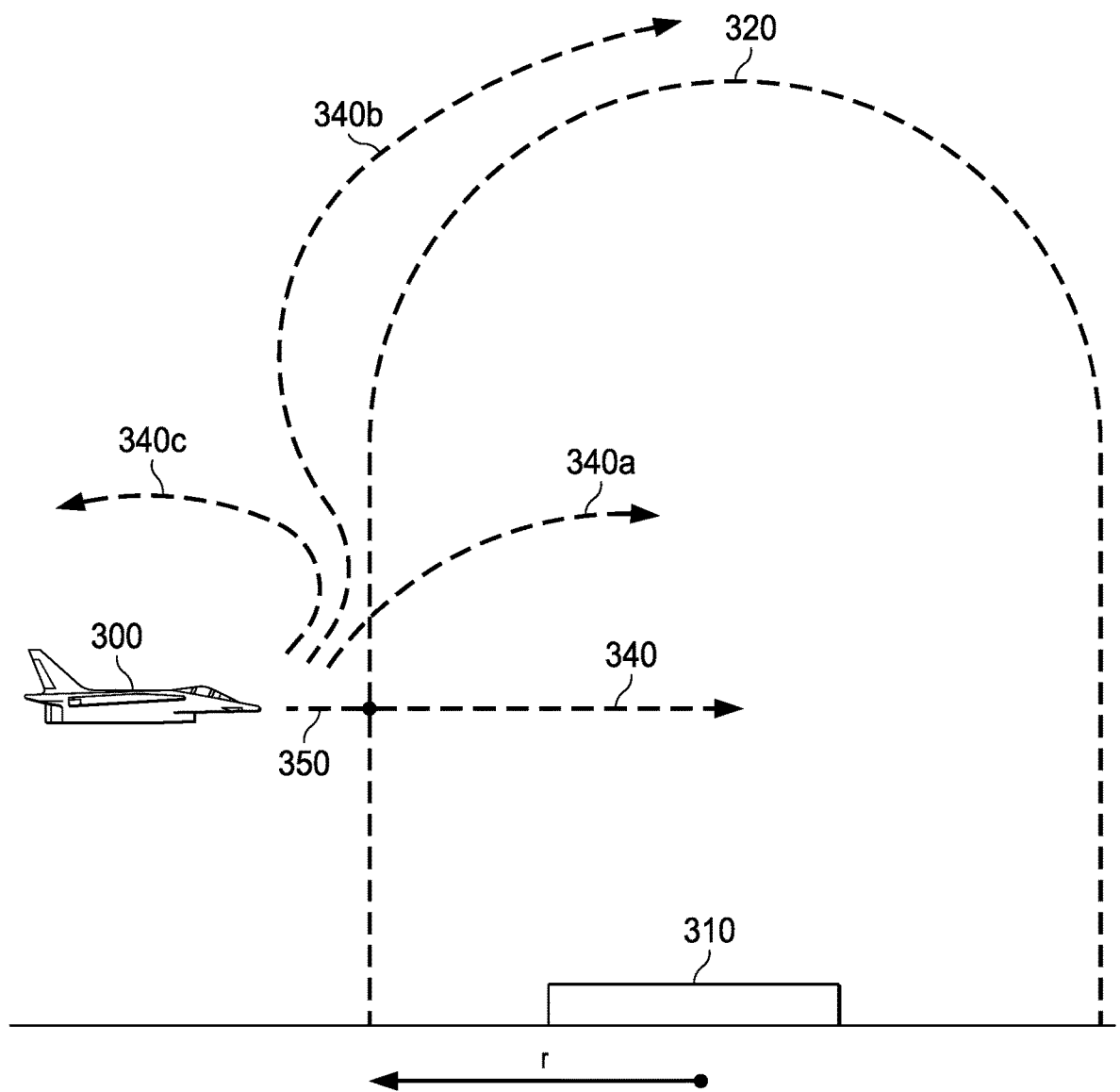
FIG. 3 shows an aircraft embodiment special view under the present disclosure.

One example of this system and method being used in practice can be seen in FIG. 3. Aircraft 300, such as aircraft 10 with flight control system 32 described above, is on a mission with general path of flight 340. At decision point 350 aircraft 300 will cross into airspace 320 above a school 310. Airspace 320 may extend up to a certain altitude or extend infinitely high (or otherwise apply to flight at all altitudes). Airspace 320 may reside over the school and an additional radius r. Up to decision point 350, aircraft 300 may be flying over a rural area with an approved probability of failure $1 \times 10^{-5}$. At decision point 350, and within airspace 320, the approved probability of failure may change to $1 \times 10^{-10}$ due to the increased risk associated with a school. A vehicle state estimator in aircraft 300 may assess, via sensors and component life cycle data, that its current failure rate is $1 \times 10^{-8}$. At element 280 of FIG. 2, such a failure rate would trigger a contingency 285. There may be multiple contingencies available for aircraft, such as flight path 340a that goes around airspace 320, flight path 340b that goes over airspace 320, and flight path 340c that causes the aircraft to return to its base. Any desirable contingency is possible, including a contingency landing away from the school. Another contingency could be dropping a payload and then proceeding along the original flight path 340. Another contingency plan could be flying in a holding pattern and/or awaiting an updated flight plan from a GCS or other source.

Elements 210, 212, 214, and 15 generally give the state estimator 200 information about the status of the aircraft 10. Elements 220, 240, 230 generally give the state estimator 200 information about a flight plan or external factors, such as physics-based models providing aircraft flight dynamics information, including due to gravity or other elements outside of the aircraft.

Figure 4:
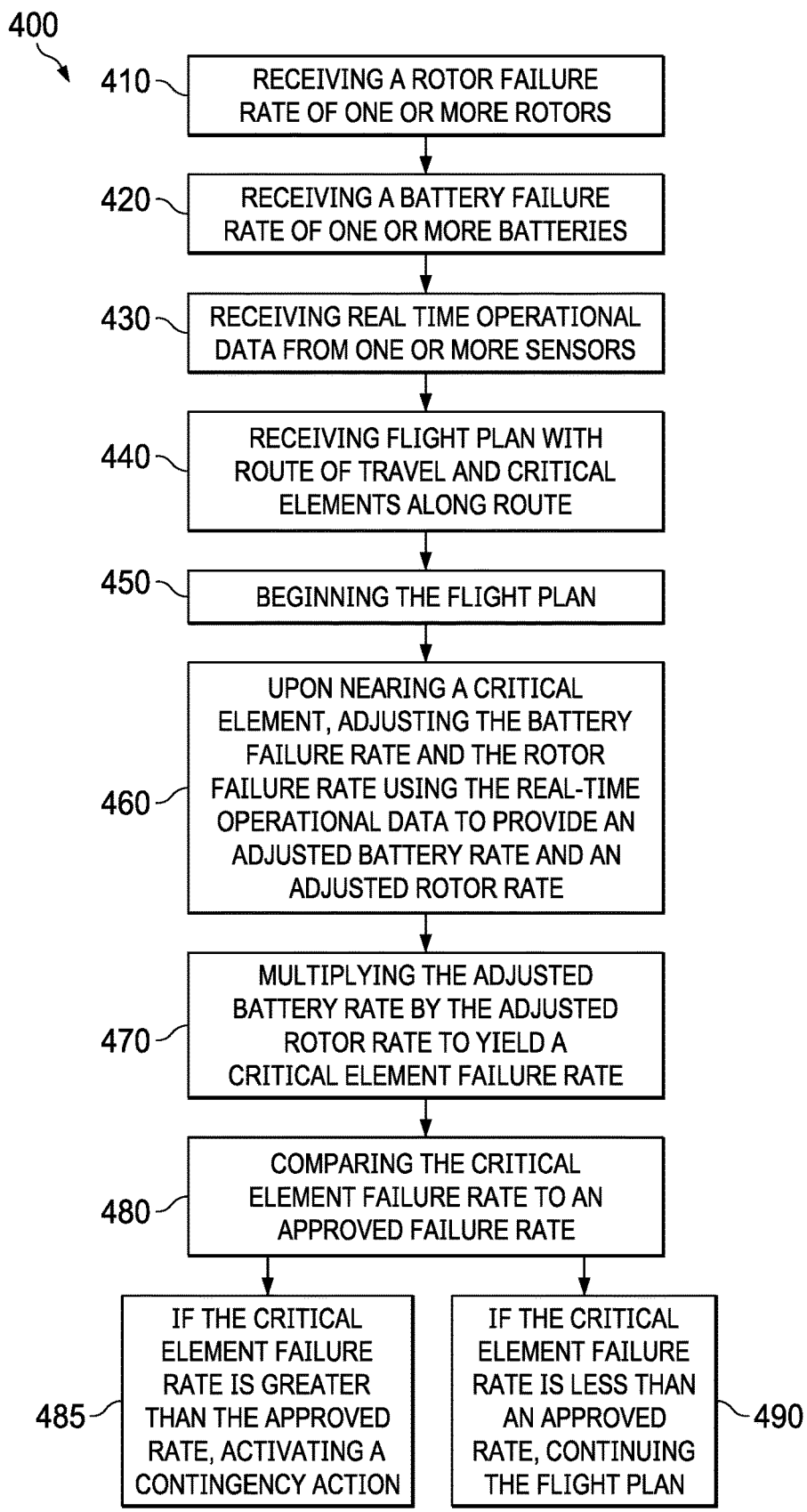
FIG. 4 shows a flow-chart of a possible method embodiment under the present disclosure.

FIG. 4 displays a possible method embodiment under the present disclosure. Method 400 illustrates one example for how failure rates and sensor data can be combined and analyzed with failure probability rates to operate an unmanned aircraft. Method 400 comprises a method for operating an unmanned aircraft. At step 410, a rotor failure rate of one or more rotors is received, by a VMS or the flight control system, or another control system or processor on the aircraft. At 420, a battery failure rate is received for one or more batteries on the aircraft. At 430, real-time operational data is received from one or more sensors on the aircraft. At 440, a flight plan is received that has a route of travel and identified critical elements along the route. At 450, the flight plan is begun. At 460, upon nearing a critical element, the battery failure rate and the rotor failure rate are adjusted based on the real-time operational data to provide an adjusted battery rate and an adjusted rotor rate. At 470, the adjusted battery rate and the adjusted rotor rate are multiplied to give a critical element failure rate related to the critical element. At 480, the critical element failure rate is compared to an approved failure rate. If the critical element failure rate is greater than the approved failure rate, then at 485a contingency action is activated. If the critical element failure rate is less than the approved failure rate, then at 490 the flight plan is continued.

Figure 5:
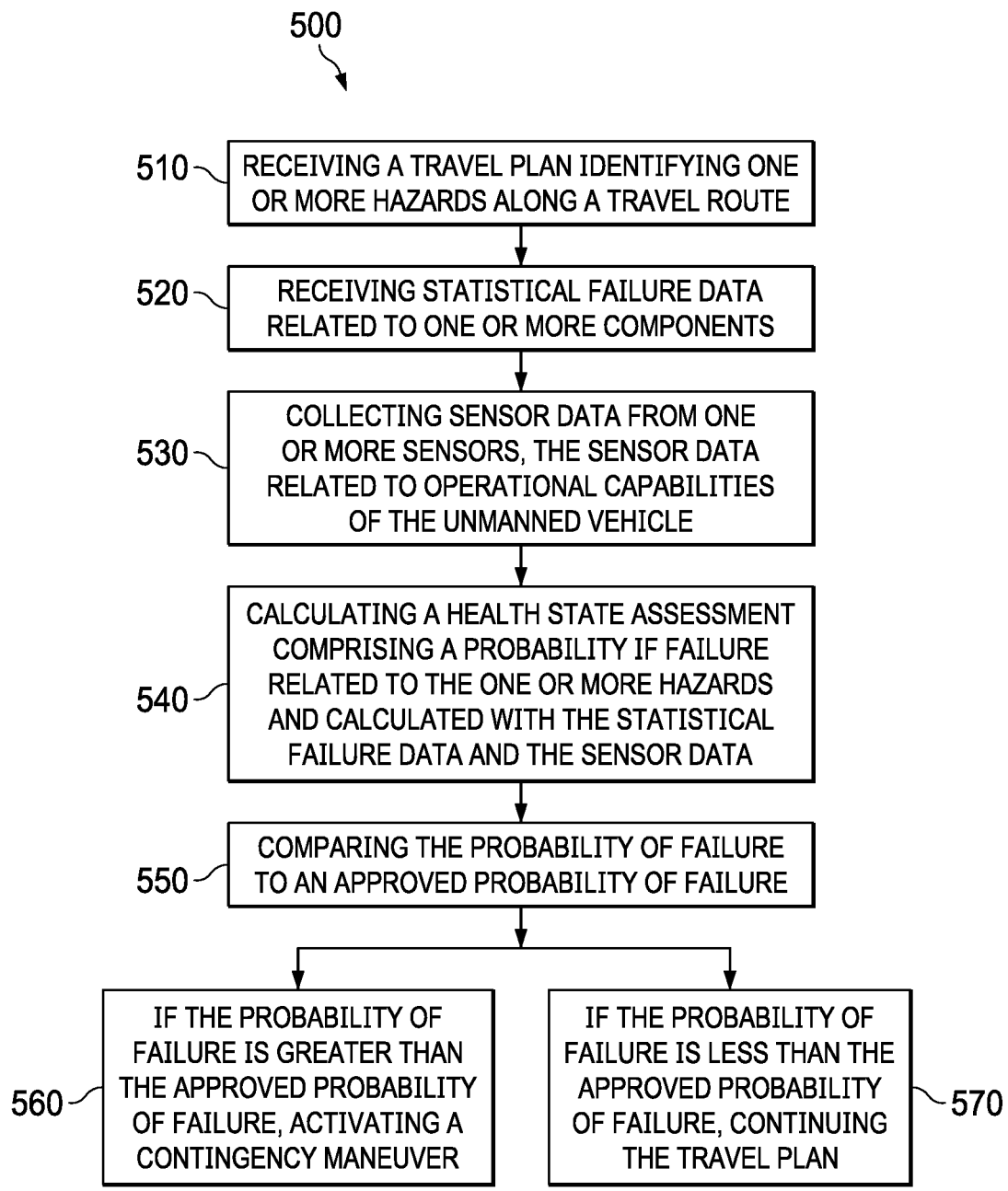
FIG. 5 shows a flow-chart of a possible method embodiment under the present disclosure.

Another example of a method embodiment can be seen in FIG. 5. Method 500 comprises a method of operating an unmanned vehicle. At 510, a travel plan can be received, by a processor or control system, that identifies one or more critical elements (such as hazards, cities, schools, etc.) along a travel route. At 520, statistical failure data related to one or more components of the unmanned vehicle can be received. At 530, sensor data is collected from one or more sensors, the sensor data related to operational variables affecting the unmanned vehicle, including for example, onboard performance and condition information and external information, e.g. environmental conditions. At 540, a health state assessment can be calculated that comprises a probability of success or failure related to the one or more critical elements, calculated using the statistical failure data and the sensor data. At 550, the probability is compared to a selected probability. At 560, if the probability of success or failure fails to satisfy the selected probability, a contingency plan or maneuver is activated. At 570, if the probability of success or failure satisfies the selected probability, then the travel plan is continued. The comparison to an approved probability can take several forms. A minimum success rate, or maximum failure rate, can be set by the FAA. The comparison may comprise a "greater than," "greater than or equal to," "less than," "less than or equal to" operation. The comparison can be with an approved, specified, or selection failure or success rate, set by the FAA or another group.

The flight control system 32 of FIG. 1A, VMS, and or remote database 210 of FIG. 2, can store or access failure rates and other statistical data about life cycles or other capabilities of any appropriate component of an unmanned vehicle. For unmanned aircraft, such data may be related to structural strength, battery life, rotors, powerplant, actuators, sensors, seals, bolts or other joints, material strength such as in aluminum, plastic or steel components, and more. For unmanned land vehicles, data may relate to tire and brake wear, engine status, oil levels, and more. Data can be failure probability rates and/or prognosis data or predictive models for diagnosing failures in a component.

Sensors, such as sensors 56, 57, 58, 59 in FIG. 1A, preferably relate to detecting characteristics that impact the components described above, though a variety of sensors can be used. Sensors can be used to detect any factor that may impact component life, such as temperature, pressure, vibration, torque, shear, compression, weight, CG, speed, location, altitude, presence of corrosive materials, direction of travel, electrical current for inputs and outputs, propulsion system output, energy source output or capacity, and more. Sensors for these factors can include thermometers, pressure sensors, pitch angle sensors, accelerometers, GPS units, force sensors, corrosive material detection sensors, and more.

A possible unmanned vehicle is shown in FIGS. 1A-1F. However, a variety of unmanned vehicles are possible under the present disclosure. Unmanned vehicles can include air, land, and water vehicles, including for example drones, helicopters, airplanes, cars, tanks, trucks, boats, and more.

An algorithm for calculating an overall failure probability rate for an unmanned vehicle can vary depending on the exact component makeup of the vehicle. An unmanned aircraft 10, shown in FIG. 1A-1F, may have four rotor assemblies and four batteries. Such an aircraft also has a given material composition, some of its parts are metals such as aluminum alloys, other components are plastics, composites, or compounds. The exact algorithm for calculating an overall (vehicle-wide) failure rate would be different than another vehicle.

Figure 6:
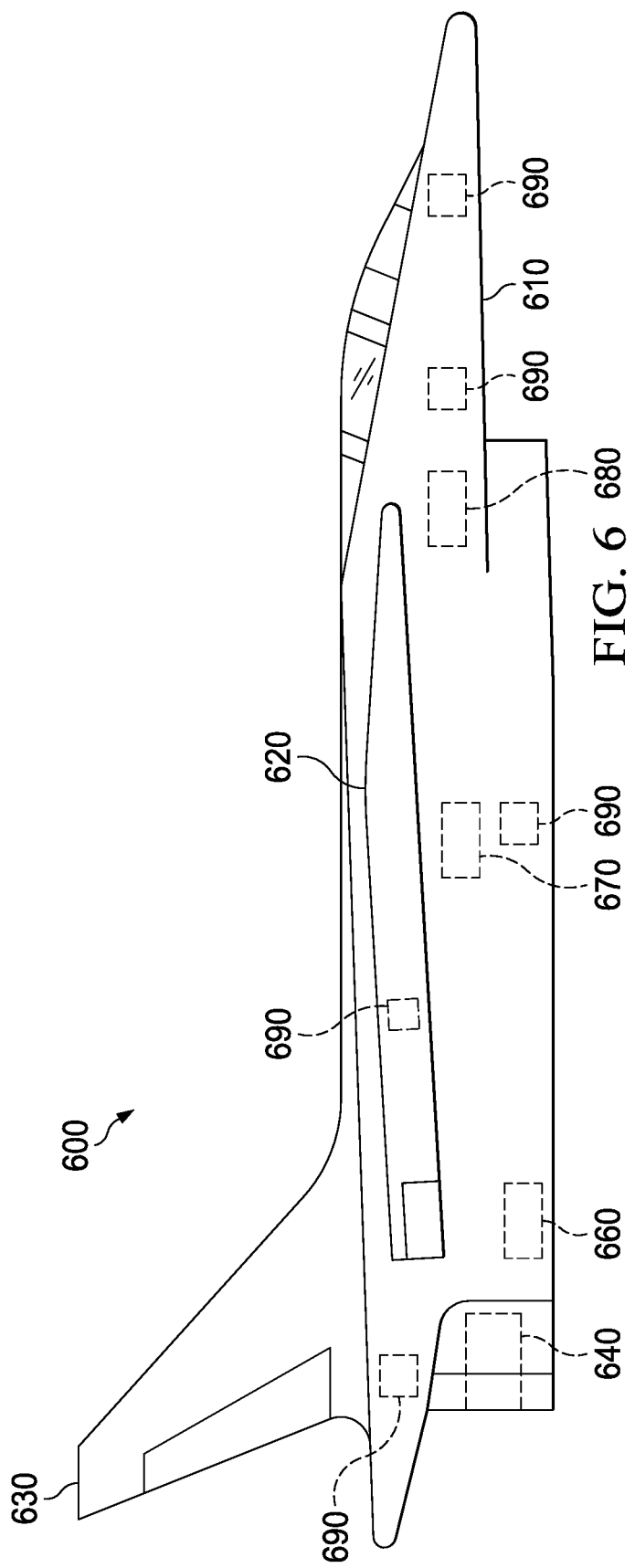
FIG. 6 shows a schematic of a possible aircraft embodiment under the present disclosure.

An unmanned aircraft with a more standard airplane form, such as fixed wing aircraft 600 in FIG. 6, may have a turbofan engine 640, wings 620, fuselage 610, and stabilizers 630, that aircraft 10 does not have. Aircraft 600 may comprise other components, such as battery 660, component A 670, and component B 680. Sensors 690 may be disposed at various locations on aircraft 600. Sensors 690 may measure operating characteristics of turbofan engine 650, wings 620, fuselage 610, fins 640, battery 660, component A 670, or component B 680. Some of sensors 690 may additionally, or alternatively, measure other factors, such as ambient temperature, pressure, speed or other characteristics such as described elsewhere in the present disclosure. Considering aircraft 600, an equation for calculating an aircraft probability of failure, such as during flight or when encountering a hazard or critical element, may look like the following:

$$\text{Prob. of failure} = (FR_{engine})(FR_{wing})(FR_{batt.})(FR_{fin})(FR_A)(FR_B)$$

In this equation FR is the failure rate for a given component. Any failure rate can be rewritten as a success rate, as long as such formatting is held consistent in the given equation. Failure rates, or success rates, can be given as a percentage (%) or as a value, such as 0.99, or 0.001.

In contrast, the equation for aircraft 10 of FIGS. 1A-1F might be as follows:

$$\text{Prob. of failure} = (FR_{wing})(FR_{batt.})(FR_{stab})(FR_{rotor})(FR_{elec\ motor})(FR_A)(FR_B)$$

Aircraft 10 has no turbofan engine, so that failure rate is left out. Furthermore, the wings 12, battery 61, and fins 20 have different form factors and other characteristics, so their failure rates will be different than those of aircraft 600. Instead of a turbofan engine, aircraft 10 has an electric motor, and rotors. Failure rates for these components are included in the equation for aircraft 10. Components A and B can refer to other components of aircraft 10 that may not be part of aircraft 600.

It is to be understood than any failure rate, such as $FR_{engine}$, may itself be calculated from various components that comprise an engine, for example. The failure rate of an engine may be calculated by multiplying together the failures rates for seals in the engine, a failure rate of a fuel injector, or compression chamber, or other components.

Sensors 690 in FIG. 6, or sensors 56, 57, 58, 59 in FIG. 1A, may impact a failure rate for a component. Statistical data and prognosis data, such as from database 210 in FIG. 2, may also impact a failure rate. For example, a given battery model, from a given manufacturer, may have a given failure rate. When an aircraft is approaching a hazard or critical element, possibly airspace around a city, a flight control system and vehicle state estimator may use the failure rate of the battery when calculating a state health assessment with a failure or success rate. When approaching airspace over a city, which may have heightened safety requirements, the flight control system may analyze sensor data, such as battery operating temperature or battery output, and combine this data with statistical data related to the battery model. Such an analysis may reveal that the battery is not operating at full strength, and may have been in use for two years, and the failure rate may need to be replaced or adjusted. For example, $FR_{batt}$ may need to be adjusted from 0.0000001 to 0.000002. This analysis can occur with a plurality of components, using sensor data and statistical and predictive data, during a flight. These analyses can be ongoing and performed in real-time, or at given intervals, such as when approaching a hazard or at a decision point. In some cases, an analysis may show that the aircraft has an overall failure rate that is too high to fly over a city. The same aircraft, with the same overall failure rate, may be allowed to fly across a different hazard, such as a highway that is transited with a briefer exposure time and unlikely to have individual exposed outside of vehicles or buildings, or an unpopulated area.

Figure 7:
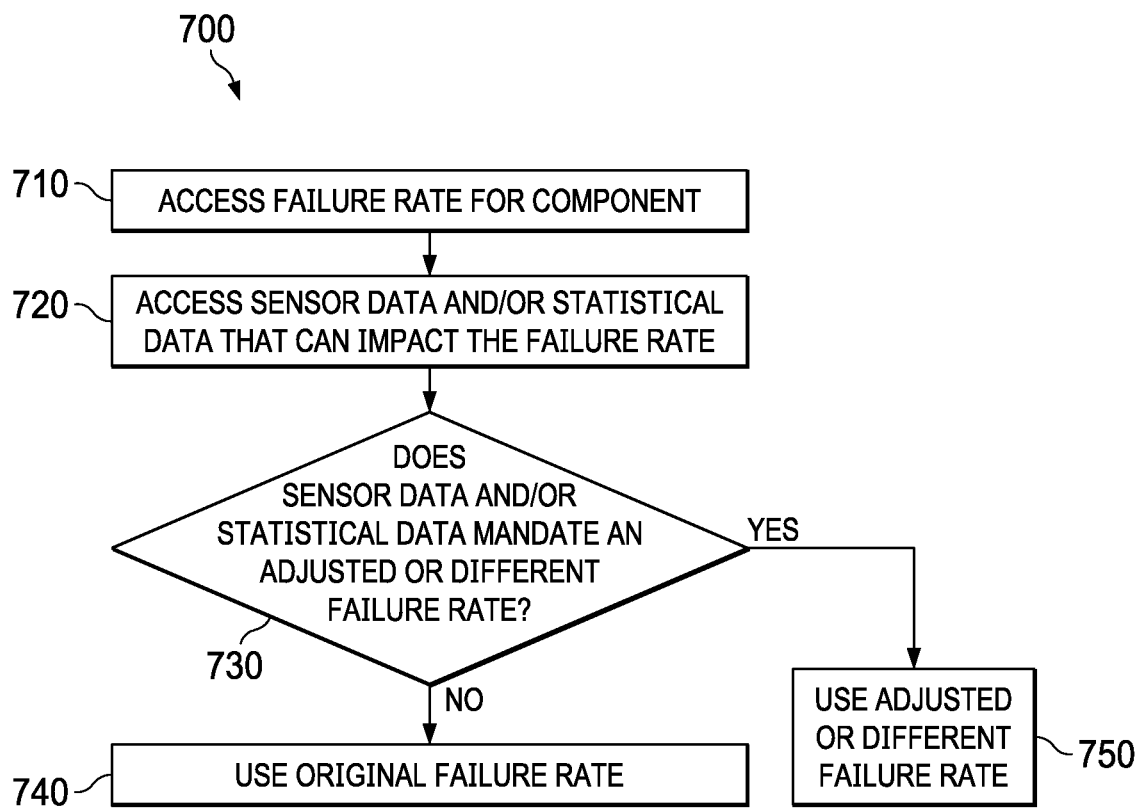
FIG. 7 shows a flow-chart of a possible method embodiment under the present disclosure.

A possible method for using sensor data or statistical data to replace or adjust the failure rate of a component can be seen in FIG. 7. In method 700, at 710, the failure rate for a component is accessed or received. At 720, sensor data or statistical data that may impact the component failure rate is accessed or received. At 730, it is determined whether the sensor or statistical data mandates an adjusted or different failure rate for the component. If no, then at 740, the original failure rate is used, such as in the equations described above. If yes, then an adjusted or different failure rate is used. A different failure rate may be mandated by the age of the component or temperature, or other data. Or sensor or statistical data may say to apply a factor, such as 0.99, to the original failure rate to reach an adjusted failure rate.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating an unmanned vehicle comprising a vehicle management system (VMS), comprising:
   receiving, by the VMS, a travel plan identifying one or more critical elements along a travel route;
   receiving, by the VMS, statistical failure data related to one or more components comprising the unmanned vehicle;
   collecting, by the VMS, sensor data from one or more sensors comprising the unmanned vehicle, the sensor data related to operational variables affecting the unmanned vehicle;
   calculating, by the VMS, a health state assessment, the health state assessment comprising a probability of failure related to the one or more critical elements and calculated with the statistical failure data and the sensor data;
   comparing, by the VMS, the probability of failure to a specified probability;
   if the probability of failure does not satisfy the specified probability, activating a contingency plan and returning to the travel plan after the contingency plan, and if the probability of failure satisfies the specified probability, continuing the travel plan; and
   diagnosing one or more problems in the one or more components based on the sensor data, wherein the probability of failure is calculated by multiplying together one or more component failure rates of the one or more components, wherein the sensor data indicates a change in a pitch angle of the unmanned vehicle, and wherein the diagnosing comprises diagnosing that the change in the pitch angle is caused by a partial or whole loss of power in a rotor assembly comprising the unmanned vehicle.

2. The method of claim 1, wherein the one or more critical elements comprise one or more airspaces around one or more locations.

3. The method of claim 2, wherein the one or more locations comprise a school with a lower specified probability than that of other of the one or more critical elements.

4. The method of claim 2, wherein the one or more locations comprise a city with a lower specified probability than that of other of the one or more critical elements.

5. The method of claim 1, further comprising updating at least one of the one or more component failure rates based on the one or more problems.

6. The method of claim 1, wherein the unmanned vehicle comprises an aircraft and the contingency plan comprises flying in a holding pattern.

7. An unmanned aircraft comprising a vehicle management system (VMS), the unmanned aircraft comprising:
   one or more components configured to assist in operating the unmanned aircraft;
   one or more sensors configured to detect real-time operational variables affecting the unmanned aircraft, wherein the one or more sensors comprise a pitch angle sensor configured to provide sensor data indicating a change in a pitch angle of the unmanned aircraft;
   one or more processors comprising the VMS that are operable to receive statistical data regarding failure of the one or more components from a remote database, further operable to receive the real-time operational data from the one or more sensors, and further operable to access a flight plan comprising identified critical elements along the flight plan;
   wherein the VMS is operable to, upon approaching a critical element, calculate a state health assessment, the state health assessment calculated by:
      calculating a component failure rate for each of the one or more components using the statistical data;
      analyzing the real-time operational data to determine if it mandates an adjustment to the component failure rates;
      adjusting the component failure rates if mandated by the real-time operational data;

multiplying the adjusted component failure rates to give a net failure probability rate; and diagnosing that the change in the pitch angle is caused by a partial or whole loss of power in a rotor assembly comprising the unmanned aircraft the VMS further operable to compare the net failure probability rate to an accepted probability, and if the net failure probability rate fails to satisfy the accepted probability, activate a contingency plan and then return to the flight plan after the contingency plan, and if the net failure probability rate satisfies the accepted failure probability, continue the flight plan.

8. The unmanned aircraft of claim 7, wherein the one or more sensors further comprises a shear stress sensor.

9. The unmanned aircraft of claim 7, wherein the one or more sensors further comprise a sensor coupled to a propulsion powerplant comprising the unmanned aircraft.

10. The unmanned aircraft of claim 7, wherein the one or more components comprise a rotor, a battery, and an actuator.

11. The unmanned aircraft of claim 7, further comprising one or more sensors configured to detect environmental data.

12. The unmanned aircraft of claim 7, wherein at least one of the one or more sensors is coupled to an actuator.

13. The unmanned aircraft of claim 7, wherein the VMS is further operable to analyze the flight plan with a physics-based model and produce a failure trajectory describing possible failures related to the identified critical elements.

14. A flight control system for an unmanned aircraft, the flight control system comprising:
one or more communication interfaces configured to receive statistical data regarding failure of one or more components comprising the unmanned aircraft from a remote database and further configured to receive a flight plan comprising identified critical elements from a ground control system;
one or more sensors configured to detect real-time operational variables affecting the unmanned aircraft, wherein the one or more sensors comprise a pitch angle sensor configured to provide sensor data indicating a change in a pitch angle of the unmanned aircraft;
one or more processors coupled to the one or more communication interfaces and the one or more sensors and configured to maneuver the unmanned aircraft, wherein the one or more processors are configured to, upon approaching a critical element, calculate a state health assessment, the state health assessment calculated by:
calculating a component failure rate for each of the one or more components using the statistical data;
analyzing the real-time operational variables to determine if it mandates an adjustment to the component failure rates;
adjusting the component failure rates if mandated by the real-time operational variables;
multiplying the adjusted component failure rates to give a net failure probability rate; and
diagnosing that the change in the pitch angle is caused by a partial or whole loss of power in a rotor assembly comprising the unmanned aircraft;
the one or more processors further configured to compare the net failure probability rate to a specified probability, and if the net failure probability rate fails to satisfy the specified probability, activate a contingency plan and then return to the flight plan after the contingency plan, and if the net failure probability rate satisfies the specified probability, continue the flight plan.

15. The flight control system of claim 14, wherein the one or more processors are further configured to calculate a failure trajectory by analyzing the flight plan with a physics-based model, the failure trajectory describing possible failure events near the one or more critical elements.

16. The flight control system of claim 14 wherein one of the one or more sensors is a shear force sensor.

17. The flight control system of claim 14, wherein the real-time operational variables comprise one or more of the following: ambient temperature, battery temperature, rotor rotations per minute, rotor input, pitch angle, location, altitude, fuel level, ambient pressure, weight, shear force, speed, rotor temperature, engine operating temperature, and processor temperature.

18. The flight control system of claim 14, wherein the one or more sensors further comprise one or more of the following: thermometer, pressure sensor, accelerometer, shear force sensor, current sensor, global positioning system sensor, weight sensor, altitude sensor, fuel level sensor, engine temperature sensor, and compressive force sensor.

* * * * *